United States Patent
Chen

(10) Patent No.: US 10,404,605 B2
(45) Date of Patent: Sep. 3, 2019

(54) PACKET PROCESSING METHOD, DEVICE AND COMPUTER STORAGE MEDIUM

(71) Applicant: Sanechips Technology Co., Ltd., Nanshan District, Shenzhen (CN)

(72) Inventor: Qinshu Chen, Shenzhen (CN)

(73) Assignee: Sanechips Technology Co., Ltd., Shenzhen (CN)

(*) Notice: Subject to any disclaimer, the term of this patent is extended or adjusted under 35 U.S.C. 154(b) by 153 days.

(21) Appl. No.: 15/307,636

(22) PCT Filed: Sep. 30, 2014

(86) PCT No.: PCT/CN2014/088009
§ 371 (c)(1),
(2) Date: Nov. 29, 2016

(87) PCT Pub. No.: WO2015/165212
PCT Pub. Date: Nov. 5, 2015

(65) Prior Publication Data
US 2017/0155592 A1    Jun. 1, 2017

(30) Foreign Application Priority Data
Apr. 30, 2014 (CN) .......................... 2014 1 0182469

(51) Int. Cl.
*H04L 12/855* (2013.01)
*H04L 29/06* (2006.01)
(Continued)

(52) U.S. Cl.
CPC .......... *H04L 47/2466* (2013.01); *H04L 29/06* (2013.01); *H04L 43/0882* (2013.01);
(Continued)

(58) Field of Classification Search
None
See application file for complete search history.

(56) References Cited

U.S. PATENT DOCUMENTS 5,361,372 A * 11/1994 Rege ..................... H04L 12/433
                                                          370/229
8,830,841 B1 * 9/2014 Mizrahi .................. H04L 43/10
                                                          370/241.1
(Continued)

FOREIGN PATENT DOCUMENTS

CN       102185780 A      9/2011
CN       102904823 A      1/2013
(Continued)

OTHER PUBLICATIONS

International Search Report and Written Opinion dated Jan. 28, 2015 for PCT Application No. PCT/CN2014/088009.
(Continued)

*Primary Examiner* — Jamaal Henson
(74) *Attorney, Agent, or Firm* — Plumsea Law Group, LLC

(57) ABSTRACT

Disclosed is a packet processing method, including: determining a type of a packet according to a parsed packet; extracting a characteristics field of the packet according to the determined type of the packet; determining a user-defined keyword corresponding to the packet and a threshold interval of the user-defined keyword according to the characteristics field; determining an OAM type of the packet according to the determined type of the packet, the user-defined keyword corresponding to the packet and the threshold interval of the user-defined keyword; and performing a corresponding OAM operation on the packet according to the determined OAM type; also disclosed are a packet processing device and a computer storage medium.

20 Claims, 2 Drawing Sheets

(51) Int. Cl.
H04L 12/26 (2006.01)
H04L 12/723 (2013.01)
H04L 12/833 (2013.01)
H04L 12/24 (2006.01)

(52) U.S. Cl.
CPC .............. H04L 43/16 (2013.01); H04L 45/50 (2013.01); H04L 47/31 (2013.01); H04L 69/22 (2013.01); *H04L 41/00* (2013.01)

(56) References Cited

U.S. PATENT DOCUMENTS

2008/0247322 A1 10/2008 Klink
2010/0046533 A1* 2/2010 Kuramoto ............... H04L 47/10
370/401

FOREIGN PATENT DOCUMENTS

CN 103414701 A 11/2013
CN 103457855 A 12/2013
WO 2013/170813 A1 11/2013

OTHER PUBLICATIONS

Extended European Search Report dated Mar. 23, 2017 for European Patent Application No. EP14890824.7.

\* cited by examiner

| Mask 1 | Mask 2 | ...... | Mask N |
|---|---|---|---|
|  |  |  |  |
| Mask 1 | Mask 2 | ...... | Mask N |
|  |  |  |  |
| Mask 1 | Mask 2 | ...... | Mask N |
FIG. 3
| Maximum range value 1 | Minimum range value 1 | ...... | Maximum range value N | Minimum range value N |
|---|---|---|---|---|
|  |  |  |  |  |
| Maximum range value 1 | Minimum range value 1 | ...... | Maximum range value N | Minimum range value N |
|  |  |  |  |  |
| Maximum range value 1 | Minimum range value 1 | ...... | Maximum range value N | Minimum range value N |
FIG. 4
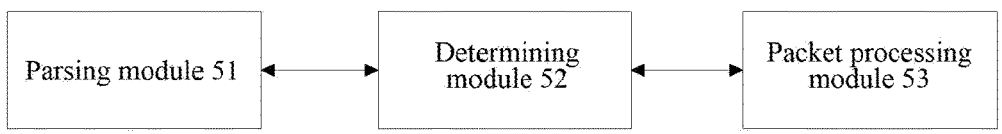
FIG. 5
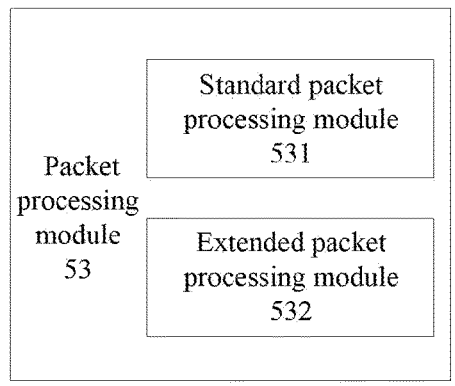
FIG. 6

PACKET PROCESSING METHOD, DEVICE AND COMPUTER STORAGE MEDIUM

CROSS-REFERENCE TO RELATED APPLICATION(S)

This application is the U.S. National Phase application of PCT application number PCT/CN2014/088009 having a PCT filing date of Sep. 30, 2014, which claims priority of Chinese patent application 201410182469.1 filed on Apr. 30, 2014, the disclosures of which are hereby incorporated by reference.

TECHNICAL FIELD

The present document relates to packet transport network technologies, and more particularly, to a packet processing method, device, and a computer storage medium.

BACKGROUND

At present, in order to meet the needs of complicated and varied carrier packet network operation, it is required to flexibly combine and use various existing Multiple Protocol Label Switching (MPLS) Operation Administration Maintenance (OAM) as well as Ethernet OAM technologies. Because the networking of the packet transport network is relatively complex and a wide range of service types can be carried, the corresponding OAM protocol is also very complex and there are relatively lots of corresponding packet types; moreover, with the development of the packet transport network, the OAM protocol is in the state of being constantly updated; in addition, it requires to process the fast connectivity detection specified in the OAM protocol in real time; although the software implementation method of the existing OAM packet detection can update the OAM protocol in real time, it cannot meet the requirement for the fast connectivity detection of more than 200 OAM protocol packets; and hardware solutions cannot meet the requirement for updating the OAM protocol, unless the chip or hardware is redesigned.

In summary, in the related art, neither software implementation nor hardware implementation can handle a lot of complex OAM protocol packets, and there is an urgent need in practical applications to have a solution meeting the constant development and update of the OAM protocol and being able to process the OAM protocol packets in real time.

SUMMARY

Aiming at the problems existing in the related art, the embodiment of the present document provides a packet processing method, device, and a computer storage medium.

The embodiment of the present document provides a method for processing a packet, herein, the method comprises:

determining a type of a packet according to a parsed packet;

extracting a characteristics field of the packet according to the determined type of the packet;

determining a user-defined keyword corresponding to the packet and a threshold interval of the user-defined keyword according to the characteristics field;

determining an operation administration and maintenance, OAM, type of the packet according to the determined type of the packet, the user-defined keyword corresponding to the packet and the threshold interval of the user-defined keyword;

performing a corresponding OAM operation on the packet according to the determined OAM type.

In the abovementioned scheme, said determining a type of a packet according to a parsed packet includes:

determining a TAG type of the packet according to the parsed packet;

extracting an Ethernet type field of the packet according to the determined TAG type of the packet;

determining the type of the packet according to the extracted Ethernet type field of the packet.

In the abovementioned scheme, said determining a user-defined keyword corresponding to the packet and a threshold interval of the user-defined keyword according to the characteristics field includes:

determining a user-defined keyword offset table address index according to the characteristics field;

looking up an offset address of the user-defined keyword according to the user-defined keyword offset address table index;

extracting the user-defined keyword of the packet according to the offset address, and determining the threshold interval of the user-defined keyword.

In the abovementioned scheme, the offset address is offset addresses of M extracted user-defined keywords, and accordingly, obtaining the user-defined keyword of the packet according to the offset address of the M user-defined keywords.

In the abovementioned scheme, said determining the threshold interval of the user-defined keyword includes:

extracting offset addresses of first N user-defined keywords in the offset addresses of the M user-defined keywords;

looking up a user-defined keyword mask table and a user-defined keyword range table according to the user-defined keyword offset address table index, and determining corresponding user-defined keyword masks;

performing a corresponding bitwise AND-logical decoding processing on the N user-defined keywords and the determined corresponding user-defined keyword masks;

determining the threshold interval of the user-defined keyword according to a result of the bitwise AND-logical decoding processing.

In the abovementioned scheme, said performing a corresponding OAM operation on the packet according to the determined OAM type includes:

when determining that it needs to perform a statistics on received packets according to the determined OAM type, counting a length of the packets and a number of the packets; and/or, when determining that it needs to modify a time stamp of the received packet according to the determined OAM type, obtaining a position of modifying the time stamp of the modified packet and modifying the position of the time stamp of the packet.

In the abovementioned scheme, performing a corresponding OAM operation on the packet according to the determined OAM type includes:

when determining that a received packet is an end packet of a present node and is a standard OAM packet according to the determined OAM type, setting an end flag of the received packet to a valid state, and directly processing the received packet in a packet processing device.

In the abovementioned scheme, said performing a corresponding OAM operation on the packet according to the determined OAM type includes:

when a received OAM packet is an end packet of a present node and is an extended OAM packet according to the determined OAM type, forwarding the received packet to outside the packet processing device, and other devices outside the packet processing device process the received packet.

In the abovementioned scheme, said performing a corresponding OAM operation on the packet according to the determined OAM type includes:

when determining that a received packet is not an end packet of a present node according to the determined OAM type, looking up a medium access control, MAC, exchange table according to a destination MAC address of the received packet, or looking up an Internet Protocol, IP, routing table of the received packet according to a destination, IP, address of the packet, and forwarding the received packet according to the MAC address exchange table or the IP routing table.

In the abovementioned scheme, when determining that the type of the packet type is a multiple protocol label switching, MPLS, packet, before extracting the characteristics field of the packet according to the determined type of the packet, the method further includes:

judging whether the packet is an end packet of the present node, and when determining that the packet is the end packet of the present node, setting an end flag of the packet to a valid state.

In the abovementioned scheme, when determining that the type of the packet is an MPLS packet, before said extracting the characteristics field of the packet according to the determined type of the packet, the method further includes:

judging whether the packet is an end packet of a present node, and when determining that the packet is not the end packet of the present node, directly forwarding the packet.

The embodiment of the present document further provides a device for processing a packet, herein the device includes: a parsing module, a determining module and a packet processing module; herein, the parsing module is configured to parse a packet;

the determining module is configured to determine a type of the packet according to the packet parsed by the parsing module; extract a characteristics field of the packet according to the determined packet type; determine a user-defined keyword corresponding to the packet and a threshold interval of the user-defined keyword based on the characteristic field of the packet; determining an operation, administration and maintenance, OAM, type of the packet according to the determined type of the packet, the user-defined keyword corresponding to the packet, and the threshold interval of the user-defined keyword;

the packet processing module is configured to perform a corresponding OAM operation on the packet according to the OAM type determined by the determining module.

In the abovementioned scheme, the determining module is configured to:

determine a TAG type of the packet according to the parsed packet;

extract an Ethernet type field of the packet according to the determined TAG type of the packet;

determine the type of the packet according to the extracted Ethernet type field of the packet.

In the abovementioned scheme, the determining module is configured to:

determine a user-defined keyword offset table address index according to the characteristics field;

look up an offset address of the user-defined keyword according to the user-defined keyword offset address table index;

extract the user-defined keyword of the packet according to the offset address, and determine the threshold interval of the user-defined keyword.

In the abovementioned scheme, the packet processing module is configured to:

when determining that it needs to perform a statistics on received packets according to the determined OAM type, count a length of the received packets and a number of the packets; and/or, when determining that it needs to modify a time stamp of a received packet according to the determined OAM type, obtain a position of modifying the time stamp of the packet, and modify the position of the time stamp of the packet.

In the abovementioned scheme, the packet processing module is configured to: when determining that a received packet is an end packet of a present node and is a standard OAM packet according to the determined OAM type, set an end flag of the received packet to a valid state and directly process the received packet within the packet processing device; or, when determining that an OAM packet is the end packet of the present node and is an extended OAM packet according to the determined OAM type, forward the received packet to outside the packet processing device, and other devices outside the packet processing device process the received packet.

In the abovementioned scheme, the packet processing module is configured to: when determining that the received packet is not an end packet of a present node according to the determined OAM type, look up a medium access control, MAC, address exchange table according to a destination MAC address of the received packet, or look up an Internet Protocol, IP routing table of the packet according to a destination IP address of the packet, and forward the received packet according to the MAC address exchange table or the IP routing table.

In the abovementioned scheme, the determining module is further configured to, when determining that the packet type is a multiple protocol label switching, MPLS, packet and before extracting the characteristics field of the packet according to the determined packet type, judge whether the packet is an end packet of a present node and when determining that the packet is the end packet of the present node, set an end flag of the packet to a valid state.

In the abovementioned scheme, the determining module is further configured to, when determining that the packet type is an MPLS packet and before extracting the characteristics field of the packet according to the determined type of the packet, judge whether the packet is an end packet of a present node, and when determining that the packet is the end packet of the present node, send the packet to the packet processing module;

accordingly, the packet processing module is further configured to, after receiving the packet sent by the determining module, directly forward the packet.

The embodiment of the present document further provides a computer storage medium, herein the computer storage medium includes a set of instructions, when executing the instructions, causing at least one processor to execute the abovementioned packet processing method.

The packet processing method, the device and the computer storage medium provided in the embodiment of the present document determine the type of the packet according to the parsed packet; extract the characteristics field of the packet according to the determined type of the packet; determine the user-defined keyword corresponding to the packet and the threshold interval of the user-defined keyword according to the characteristics field; determine the OAM type of the packet according to the determined OAM type, the user-defined keyword corresponding to the packet and the threshold interval of the user-defined keyword; execute the corresponding OAM operation on the packet according to the determined OAM type; determine the OAM type of the packet according to the user-defined keyword corresponding to the packet and the threshold interval of the user-defined keyword; therefore, it can adapt to a variety of known and unknown OAM protocol packets so as to satisfy the expansion of the OAM protocol, and further satisfy the connectivity detection requirements of the large-scale multi-connectivity real-time OAM protocol packets, and solve the problems in the prior art that the commercial packet switching chip cannot be quickly updated and the large-scale OAM connectivity detection cannot be performed in real time.

BRIEF DESCRIPTION OF THE DRAWINGS

In the accompanying drawings (which are not drawn necessarily to scale), like reference numerals may be used to describe like parts in different views. Similar reference numerals with different letter suffixes may represent different examples of similar components. The accompanying drawings illustrate, by way of example rather than limitation, various embodiments discussed herein in general.

FIG. 3 is a schematic diagram of the structure of a user-defined mask table provided in the first embodiment of the present document;

FIG. 4 is a schematic diagram of the structure of a user-defined keyword range table provided in the first embodiment of the present document;

FIG. 5 is a schematic diagram of the structure of a packet processing device provided in a second embodiment of the present document;

FIG. 6 is a schematic diagram of the structure of a packet processing module provided in the second embodiment of the present document.

DETAILED EMBODIMENTS OF THE INVENTION

Figure 1:
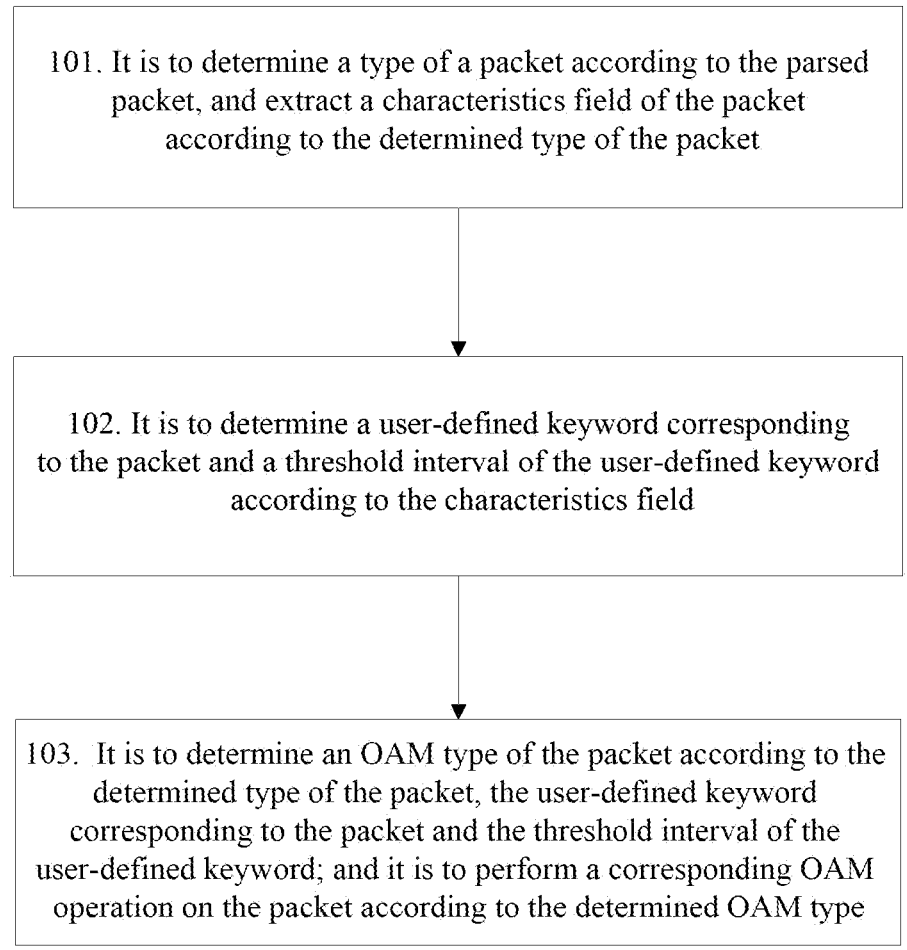
FIG. 1 is a flow chart of a packet processing method in accordance with a first embodiment of the present document.

For a better understanding of the content of the present document, the definition and function of the OAM will be described first.

The OAM function is very important in the public telecommunication networks, it can simplify the network operation, check the network performance and reduce the network running cost. The OAM function is particularly important in networks that provide guaranteed quality of service. The corresponding OAM function has been defined in the traditional Synchronous Optical Hierarchy/Synchronous Optical Network (SDH/SONET) and the Asynchronous Transfer Mode, the packet transport network, as a key bearer technology of the next generation scalable network, can provide multi-service capability with guaranteed Quality of Service (QoS), therefore, the packet transport network urgently needs to have the OAM capability. The OAM mechanism not only can prevent the occurrence of network failures, but also need to achieve the rapid diagnosis and positioning of the network failures, thus ultimately improving the availability and the quality of service of the network.

According to the actual needs for network operating of the operator, usually the network management is divided into three categories: Operation, Administration and Maintenance, referred to as OAM; herein, generally speaking, the operation mainly completes the works of analyzing, forecasting, planning and configuring the daily network and services; the maintenance mainly completes the works of testing the daily network and the services and implementing the fault management, etc.

International Telecommunication Union Telecommunication (ITU-T) has defined the OAM function as follows:

(1) monitoring performance and generating maintenance information, and assessing the stability of the network according to the information;

(2) detecting network failure through regular checking, and generating a variety of maintenance and alarm information;

(3) scheduling or switching to other entities and bypassing failed entities to ensure the normal operation of the network;

(4) transferring the failure information to the management entity.

The OAM solution of the large backbone network is expected by the operator to cover three major areas: fault detection, network reliability measurement and network status monitoring; but at present no OAM mechanism can implement all abovementioned OAM functions. Although most MPLS applications are implemented based on the IP, which can basically meet requirements of the operator for such applications, such as: multi-protocol label switching+border gateway protocol+virtual private network (MPLS+BGP+VPN), and Resource ReSerVation Protocol-Traffic Engineering (RSVP-TE), etc. However, the OAM mechanism must be combined with other network maintenance and management tools such as powerful network management tools, or in conjunction with the Service Level Agreement (SLA) to standardize the maintenance process.

Based on this, in various embodiments of the present document: determining the type of the packet according to the parsed packet; extracting the characteristics field of the packet according to the determined type of the packet type; determining, according to the characteristics field, the user-defined keyword corresponding to the packet as well as the threshold interval of the user-defined keyword; and determining the OAM type of the packet according to the determined type of the packet, the user-defined keyword corresponding to the packet and the threshold interval of the user-defined keyword; and performing a corresponding OAM operation on the packet according to the determined OAM type.

Hereinafter, the technical solution of the present document will be described in further details with reference to the accompanying drawings and specific embodiments.

The First Embodiment

The embodiment of the present document provides a packet processing method, and as shown in FIG. 1, the method mainly includes the following steps.

In step 101: it is to determine the type of the packet according to the parsed packet, and extract the characteristics field of the packet according to the determined type of the packet;

herein, said determining the packet type according to the parsed packet specifically includes:

determining a TAG type of the packet according to the parsed packet;

extracting an Ethernet type field of the packet according to the determined TAG type of the packet;

determining the type of the packet according to the extracted Ethernet type field of the packet.

Specifically, receiving a packet and a timestamp corresponding to the packet input from an external interface, parsing the packet, extracting the destination MAC address, the source MAC address, and the TAG type of the packet according to the format of the packet, and extracting information such as the Ethernet type field of the packet, etc., according to the TAG type of the packet; herein, the packets can be correctly forwarded according to the destination MAC address and the source MAC address; the timestamp includes: a transmitting timestamp and a receiving timestamp; the transmitting timestamp is a time value corresponding to the time point of transmitting the packet, and the receiving timestamp is a time value corresponding to the time point receiving the packet; and the link delay can be calculated according to the transmitting timestamp and the receiving timestamp.

In practical applications, the Request for Comments (RFC) document in the network protocol specifies the TAG types of various packets from which the Ethernet type field of a packet can be extracted, for example, when that the TAG type of the packet is determined to be a TAG without VLAN information (unTAG), the 12th and 13th bytes of the packet are extracted, and the 12th and 13th bytes of the packet are the Ethernet type field of the packet; when the TAG type of the packet is determined to be a TAG with a single-layer TAG, the 16th and 17th bytes of the packet are extracted, and the 16th and 17th bytes of the packet are the Ethernet type field of the packet; when the TAG type of the packet is determined to be a TAG with double-layer VLAN information (double TAG), the 20th and 21st bytes of the packet are extracted, and the 20th and 21st bytes of the packet are the Ethernet type field of the packet.

Judging whether the packet is an Internet Protocol version four (IPv4) packet, an Internet protocol version sixth (IPv6) packet, an MPLS packet or a user-defined packet according to the extracted Ethernet type field of the packet, and then extracting the characteristics field of the packet according to the determined type of the packet;

specifically, the RFC document specified the type of the packet corresponding to each Ethernet type field as well as the corresponding characteristics field, whereby the characteristics field of the packet can be extracted. For example, if it is determined that the Ethernet type field of the packet is 0x0800, that is, the type of the packet is determined to be an IPv4 packet; the extracted characteristics field of the packet may include: the destination IP address, the source IP address, the IP protocol number, the IP Time To Live (IP TTL), and the IP Differentiated Services Code Point (IP DSCP) priority of the packet;

if it is determined that the Ethernet type field of the packet is 0x86DD, that is, the type of the packet is determined to be an IPv6 packet; the extracted characteristics field of the packet may include: the destination IP address, the source IP address, the IP Protocol number, the IP TTL, and the IP DSCP priority of the packet.

Herein, when determining that the packet is a UDP packet according to the IP protocol number, the extracted characteristics field of the packet may further include: the destination UDP port number and the source UDP port number; when determining that the packet is a TCP packet according to the IP protocol number, the extracted characteristics field of the packet may further: the TCP connectivity number of the packet; herein, the characteristics field includes: a fixed-format keyword and a user-defined keyword;

If it is determined that the Ethernet type field of the packet is 0x8847, that is, the packet type is determined to be a MPLS packet, the extracted characteristics field of the MPLS packet may include: a tag of each layer of the MPLS packet, priority corresponding to the tag, and the TTL value corresponding to the tag.

Accordingly, if the determined packet type is an MPLS packet, it is to look up the label switching table according to the tag of the packet to judge whether the packet is the end packet of the present node; if it is determined that the packet is not the end packet of the present node, it is to obtain the corresponding forwarding port according to the label switching result obtained by looking up the label switching table, and directly forward the packet without extracting the characteristics field of the customer layer of the MPLS packet; herein, the label switching table is obtained through the route distribution protocol which can obtain the network structure and the corresponding label switching content of the whole network; the label switching content includes: all the exchange information of the label switching in the whole network.

Herein, if it is determined that the packet is the end packet of the present node, the end flag of the packet is set to the valid state, and it is to judge whether the Ethernet packet or the IP packet is carried in the packet according to the label switching table; if it is the Ethernet packet carried in the packet, the extracted characteristics field in the client layer of the Ethernet packet may include information such as the destination MAC address and the source MAC address of the Ethernet packet, and it is to judge the TAG type of the client layer; if it is the IP packet carried in the packet, the characteristics field in the client layer of the extracted IP packet may include information such as the destination IP address and the source IP address of the packet. Herein, when the type of the packet is a MPLS packet, the MPLS packet may carry the Ethernet packet and the IP packet because the MPLS packet is a multi-protocol label switching packet, and if the MPLS packet carries the Ethernet packets or the IP packet, the Ethernet packet or the IP packet can be obtained after removing the MPLS header, and afterwards, the MPLS packet, the Ethernet packet, and the IP packet can be processed at the same time; herein, said judging the TAG type in the client layer is for determining how many layers of VLAN information are included in the content of the client layer of the MPLS packet and correctly extracting the characteristics field in the client layer of the packet according to the number of layers of the VLAN; said setting the end flag to the enabled state can be: setting the end flag to 1.

Accordingly, if the type of the packet is an Ethernet packet, an IP packet, or a user-defined packet, there is no need to judge whether the IP packet or the user-defined packet is the end packet of the present node, and there is no need to extract the characteristics field information in the client layer of the packet, and the step 102 can be directly executed.

In step 102: it is to determine the user-defined keyword corresponding to the packet and the threshold interval of the user-defined keyword according to the characteristics field of the packet;

In this step, it is to determine the user-defined keyword offset table address index according to the characteristics field;

it is to look up the offset address of the user-defined keyword according to the user-defined keyword offset address table index;

it is to extract the user-defined keyword of the packet according to the offset address, and determine the threshold interval of the user-defined keyword.

Specifically, when MPLS packets, Ethernet packets and IP packets are inputted from different packet input ports at the same time, the user-defined keyword address table index (udf_addr_idx) is obtained according to the input ports of the packets, the types of the packets, and the characteristics fields of the packets, and an offset address table of the user-defined keyword is looked up according to the keyword offset address table index, the offset addresses of M user-defined keywords are extracted based on the offset address table, and the user-defined keywords of the corresponding packets are obtained according to the offset addresses of the M user-defined keywords.

Herein, the characteristics field of the packet includes: an Ethernet type field of the packet, the TAG type of the packet, the tag number, the IP protocol number, whether the IP packet has an optional identification and the type of the packet, the characteristics field in the client layer of the packet; each offset address includes a template type value and a relative offset value, and after the template type value and the relative offset value are logically decoded, the offset address of the user-defined keyword can be obtained; the information in the offset address table can be configured in advance according to the actual needs, and the offset address may be configured according to the latest OAM protocol.

Figure 2:
FIG. 2 is a schematic diagram of an Ethernet packet format in which the TAG type of a packet is double TAG in accordance with the first embodiment of the present document.

Herein, an Ethernet packet whose TAG type is the double TAG is taken as an example, as shown in FIG. 2, the Ethernet packet whose TAG type is the double TAG includes: Ethernet destination MAC address (DA), source MAC address (SA), supplier VLAN (SVLAN), client-layer VLAN (CVLAN), Ethernet type field (ETYPE), User data (Playload), and cyclic redundancy check (CRC).

Take the packet format shown in FIG. 2 as an example, the logical decoding processing on the offset address of the user-defined keyword may include:

starting to decode after the Ethernet type field according to the value of the template type, setting the relative offset value to 3, then the position of extracting the user-defined keyword is at the (22+3)th byte;

when an Ethernet packet whose TAG type is the single TAG is taken as an example, it is to start to decode after the Ethernet type field (ETYPE) according to the template type value and set the relative offset value to 3, then the location of extracting the user-defined keyword is at the (16+3)th byte;

herein, the offset address may also be pre-configured, and the relative offset value is not configured any more, and the user-defined keyword is directly extracted according to the pre-configured offset address.

Accordingly, said determining the threshold interval of the user-defined keyword particularly includes:

after calculating the offset addresses of M user-defined keywords, extracting the offset addresses of the first N user-defined keywords from the offset addresses of the M user-defined keywords to realize the regular expression; looking up the user-defined keyword mask table and the user-defined keyword range table according to the user-defined keyword offset address table index (udf_addr_idx); after looked up the user-defined keyword mask table and the user-defined keyword range table, first performing the bitwise AND-logical decoding processing on the N user-defined keywords and the user-defined keyword masks, and then judging the threshold interval of the user-defined keyword after the bitwise AND-logical decoding processing has been performed on the user-defined keyword and the mask, so as to determine whether the threshold interval is larger than the maximum range value of the range table, between the maximum and minimum range values of the range table, or less than the minimum range value of the range table; herein, each of the user-defined keywords includes the corresponding mask, the maximum range value and the minimum range value; herein M and the N are natural numbers greater than 0, and N is less than or equal to M; the regular expression is: using a single character string to describe and match a series of character strings that conform to a certain syntactic rule, and in many text editors, the regular expression is often used to: retrieve and replace texts that match a mode; herein, when the larger values M and N are, the more flexible the device processing is, but accordingly, it is harder to implement; the structure of the user-defined mask table is shown in FIG. 3, and each row in the user-defined mask table includes N masks udf_mask The user-defined keyword range table is shown in FIG. 4, and each row in the user-defined keyword range table includes N pairs of maximum range value udf_max and minimum range value udf_min.

In practical applications, the number of rows of the user-defined mask table and the user-defined keyword range table may be preset in accordance with the actual situation.

In step 103, it is to determine the OAM type of the packet according to the determined type of the packet, the user-defined keyword corresponding to the packet, as well as the threshold interval of the user-defined keyword; and perform the corresponding OAM operation on the packet based on the determined OAM type.

Specifically, it is to look up the OAM identification table according to the input port of the packet, the type of the packet, the destination MAC address and the source MAC address of the packet, the Ethernet type field, the TAG type of the packet, the VLAN, the destination IP address, the source IP address, the IP protocol number, the number of tags and the tag value, the user-defined keyword and the threshold interval of the user-defined keyword, and to determine the OAM type of the packet according to the result of looking up the table.

Said performing the corresponding OAM operation on the packet according to the determined OAM type specifically includes:

judging whether it needs to perform a statistics on the received packet according to the determined OAM type, and whether it needs to modify the timestamp of the received packet; herein, if it needs to modify the timestamp of the packet, it also needs to obtain the position of modifying the timestamp of the packet; if it needs to perform a statistics on the packet, it needs to count the length of the packet and the number of packets.

Judging whether the packet is the end packet of the present node according to the determined OAM type, and if the packet is the end packet of the present node and it is a standard OAM packet, it is to set the end flag of the received packet to the valid state, and directly process the packet within the packet processing device; if the packet is the end packet of the present node and is an extended OAM packet, forward the packet to outside the packet processing device, so that other devices outside the packet processing device process the received packet; said setting the end flag to the valid state can be: setting the end flag to 1.

In practical applications, various functions of the packet processing device can be achieved through chip circuits.

Herein, when determining that the packet is not the end packet of the present node according to the determined OAM type, it is to loop up a medium access control (MAC) exchange table according to the destination MAC address of the packet, or look up the IP routing table of the received packet according to the destination Internet Protocol (IP) address of the packet, and forward the received packet according to the MAC address exchange table or the IP routing table.

Herein, the OAM identification table can be realized by a Ternary Content Accessable Memory (TCAM), and the content in the OAM identification table can be configured according to the OAM protocol and the specific network structure; in the OAM identification table, fields or bit streams that are not related to the OAM packet may be covered by masks.

The MAC address exchange table is a table to be looked up when switching is performed on the Ethernet services, herein, the MAC address exchange table can be stored in a random access memory (RAM), and the MAC address exchange table can be automatically updated during the process that the switching is performed on the Ethernet services.

The IP routing table is a table to be looked up when IP packets are forwarded, herein, the IP routing table may be stored in a RAM or in a TCAM.

The Second Embodiment

Corresponding to the first embodiment, the embodiment of the present document further provides a packet processing device, and as shown in FIG. 5, the device includes parsing module 51, determining module 52, and packet processing module 53; herein, the parsing module 51 is configured to parse a packet;

the determining module 52 is configured to determine the type of the packet according to the packet parsed by the parsing module 51; and extract a characteristics field of the packet according to the determined type of the packet; according to the characteristics field of the packet, determine a user-defined keyword corresponding to the packet and a threshold interval of the user-defined keyword; determine an OAM type of the packet according to the determined type of the packet, the user-defined keyword corresponding to the packet, and the threshold interval of the user-defined keyword;

the packet processing module 53 is configured to perform the corresponding OAM operation on the packet according to the OAM type determined by the determining module 52.

Herein, when a packet is inputted, the parsing module 51 receives the packet and the timestamp corresponding to the packet inputted from the external interface, and parses the packet; and the determining module 52 determines the TAG type of the packet according to the parsed packet; extracts the Ethernet type field of the packet according to the determined TAG type of the packet; and determines the type of the packet according to the extracted Ethernet type field of the packet.

Herein, the determining module 52 can extract the destination MAC address and the source MAC address of the packet, as well as the TAG type of the packet according to the format of the parsed packet, and extract information such as the Ethernet type field of the packet according to the TAG type of the packet; herein, the timestamp is the transmitting timestamp and the receiving timestamp; the transmitting timestamp is the time value corresponding to the time point of transmitting the packet, and the receiving timestamp is the time value corresponding to the time point of receiving the packet; the link delay can be calculated according to the transmitting timestamp and the receiving timestamp, and the packet can be forwarded correctly according to the destination MAC address and the source MAC address.

In practical applications, according to the TAG types of various packets specified in the RFC document in the network protocol, the determining module 52 may extract the Ethernet type field of the packet, for example, when the determining module 52 determines that the TAG type of the packet is a TAG of the VLAN information (unTAG), the 12th and 13th bytes of the packet are extracted, and the 12th and 13th bytes of the packet are the Ethernet type field of the packet; when the determining module 52 determines that the TAG type of the packet is the TAG with single-layer VLAN information (single TAG), the 16th and 17th bytes of the packet are extracted, and the 16th and 17th bytes of the packet are the Ethernet type field of the packet; when the determining module 52 determines that the TAG type of the packet is a TAG with double-layer VLAN information (double TAG), the 20th and 21st bytes of the packet are extracted, herein the 20th and 21st bytes of the packet are the Ethernet type field of the packet.

Accordingly, the determining module 52 may judge whether the packet is an IPv4 packet, an IPv6 packet, an MPLS packet, or a user-defined packet according to the extracted Ethernet type field;

herein, the RFC document specified the type of the packet corresponding to each Ethernet type field and the corresponding characteristic field, and the determining module 52 can extract the characteristics field of the packet accordingly, for example, when the determining module 52 determines that the Ethernet type field of the packet is 0x0800, that is, determines that the type of the packet is an IPv4 packet; the extracted characteristics field of the packet may include the destination IP address, source IP address, IP protocol number, IP TTL, and IP DSCP priority of the packet.

If the determining module 52 determines that the Ethernet type field of the packet is 0x86DD, that is, determines that the type of the packet is an IPv6 packet, the extracted characteristics field of the packet may include: the destination IP address, source IP address, IP protocol number, IP TTL, and IP DSCP priority of the packet.

Herein, when the determining module 52 determines that the packet is a UDP packet according to the IP protocol number, the extracted characteristics field of the packet may further include: destination UDP port number and source UDP port number; when the determining module 52 determines that the packet is a TCP packet according to the IP protocol number, the extracted characteristics field of the packet may further include: a TCP connection number; herein, the characteristics field includes a keyword with fixed format and the user-defined keyword.

When the Ethernet type field determined by the determining module 52 is 0x8847, that is, the type of the packet is determined as MPLS packet, the extracted characteristics field of the packet includes: a tag of each layer of the packet, the priority and the TTL value corresponding to the tag.

Accordingly, if the packet type determined by the determining module 52 is an MPLS packet, the label switching table is looked up according to the tag of the packet to judge whether the packet is the end packet; when it is determined that the packet is not the end packet of the present node, the packet processing module 53 is configured to: obtain the corresponding forwarding port according to the label switching result obtained by looking up the label switching table and forward the packet; the determining module 52 does not need to extract the characteristics field in the client layer of the MPLS packet; herein, the label switching table is obtained through the route distribution protocol, and the route distribution protocol can obtain the network structure of the entire network and the corresponding label switching content; the label switching content includes: all the switching information of the label switching in the whole network.

Herein, when the determining module 52 determines that the packet is the end packet of the present node, it is to set the end flag of the packet to the valid state, and judge whether the packet carries an Ethernet packet or an IP packet according to the label switching table; if it is determined that the packet carries the Ethernet packet, the extracted characteristics field in the client layer of the Ethernet packet may include destination MAC address and source MAC address of the Ethernet packet, and it is to judge the TAG type of the client layer, when it is determined that it is the IP packet carried on the packet, the extracted characteristics field in the client layer of the IP packet may include the destination IP address and the source IP address of the IP packet. Here, when the type of the packet is an MPLS packet, because the MPLS packet is a multi-protocol label switching packet, the MPLS packet can carry the Ethernet packet and the IP packet, and if the MPLS packet carries the Ethernet packet or the IP packet, after removing the MPLS packet header, the Ethernet packet or the IP packet can be obtained; thereafter, the MPLS packet, the Ethernet packet and the IP packet can be processed at the same time; herein, judging the TAG type in the client layer is for determining how many layers of VLAN information is included in the content of the client layer of the MPLS packet, and the characteristics field in the client layer of the packet is extracted correctly according to the number of layers of the VLAN; Said setting the end flag to the valid state can be: setting the end flag to 1.

Accordingly, if the type of the packet is an Ethernet packet, an IP packet, or a user-defined packet, the determining module 52 does not need to judge whether the IP packet or the user-defined packet is the end packet of the present node, and does not need to extract information of the characteristic field in the client layer of the packet, and it can directly determine the user-defined keyword corresponding to the packet and the threshold interval of the user-defined keyword.

Said determining the user-defined keyword corresponding to the packet and the threshold interval of the user-defined keyword according to the characteristics field of the packet specifically includes:

determining the user-defined keyword offset table address index according to the characteristics field;

looking up the offset address of the user-defined keyword according to the user-defined keyword offset address table index;

extracting the user-defined keyword of the packet according to the offset address, and determining the threshold interval of the user-defined keyword.

Specifically, when the MPLS packet, the Ethernet packet and the IP packet are simultaneously input from different packet input ports, the determining module 52 determines the user-defined keyword offset table address index according to the characteristics field; searches for the offset address of the user-defined keyword according to the keyword offset address table index (udf_addr_idx); extracts the user-defined keyword corresponding to the packet according to the offset addresses of the M user-defined keywords, and determines the threshold interval for the user-defined keyword.

Herein, the characteristics field of the packet includes: the Ethernet type field of the packet, the TAG type, the number of tags, the IP protocol number, whether the IP packet has an optional identification and the packet type, the characteristics field in the client layer of the packet; each offset address includes a template type value and a relative offset value, after the determining module 52 performs a logical decoding processing on the template type value and the relative offset value to obtain the offset address of the user-defined keyword; the information in the offset table can be pre-configured according to the actual needs, and the offset address can be configured according to the latest OAM protocol.

Here, an Ethernet packet whose TAG type is double TAG is taken as an example, and as shown in FIG. 2, the Ethernet packet whose TAG type is double TAG includes: the Ethernet destination MAC address (DA), source MAC address (SA), supplier VLAN (SVLAN), client-layer VLAN (CV-LAN), Ethernet type field (ETYPE), user data (Payload), and cyclic redundancy check (CRC).

Take the packet format shown in FIG. 2 as an example, the logical decoding processing on the offset address of the user-defined keyword may include:

starting to decode after the Ethernet type field according to the template type value, setting the relative offset value to 3, and the position of extracting the user-defined keyword is at the (22+3)th byte.

When taking an Ethernet packet whose TAG type is the single TAG as an example, the decoding calculation is performed after the Ethernet type field (ETYPE) according to the template type value, and the relative offset value is set to 3, then the position of extracting the user-defined keyword is at the (16+3)th byte;

Here, the offset address may be pre-configured so that the relative offset value is not configured any more, and the user-defined keyword is directly extracted according to the pre-configured offset address.

Accordingly, the determining module 52 determines the threshold interval of the user-defined key, specifically including:

after the determining module 52 calculates the offset addresses of the M user-defined keywords, taking the offset addresses of the first N user-defined fields from the offset addresses of the M user-defined keywords to achieve a regular expression; looking up the user-defined keyword mask table and the user-defined keyword range table according to the user-defined keyword offset address table index udf_addr_idx; after looked up the user-defined keyword mask table and the user-defined keyword range table, performing the corresponding bitwise AND-logical decoding processing on the N user-defined keywords and the user-defined keyword masks, and then judging the threshold interval of the user-defined keyword, after the AND-logical decoding processing has been performed on the user-defined keyword and masks, to determine whether the threshold interval in use is greater than the maximum range value of the range table, between the maximum and minimum range values of the range table, or less than the minimum range value of the range table; herein, each of the user-defined keywords includes a corresponding mask, a maximum range value and a minimum range value; and M and N are natural numbers greater than 0, and N is less than or equal to M; the regular expression is: using a single character string to describe and match a series of character strings that conform to a certain syntactic rule. In many text editors, the regular expression is often used to: retrieve or replace texts that match a certain mode; here, when the greater values M and N are, the more flexible the device processing is, but relatively speaking, the implementation is more difficult.

The structure of the user-defined mask table is shown in FIG. 3, and each row in the user-defined mask table includes N masks udf_mask.

The user-defined keyword range table is shown in FIG. 4, and each row in the user-defined keyword range table includes N pairs of maximum range values udf_max and minimum range values udf_min.

In practical applications, the number of rows in the user-defined mask table and the user-defined keyword range table may be preset in accordance with the actual situation.

The determining module 52 looks up the OAM identification table according to information, such as the input port of the packet, the packet type, the destination MAC address and the source MAC address of the packet, the Ethernet type field, the TAG type of the packet, the VLAN, the destination IP address, the source IP address, the IP protocol number, the number of tag layers and the tag value, the user-defined keyword and the threshold interval of the user-defined keyword, etc, and determines the OAM packet type of the packet according to the result of looking up the table.

The packet processing module 53 is configured to:

judge whether it needs to perform a statistics on the received packet according to the determined OAM packet type, and whether it needs to modify the timestamp of the received packet; and if it needs to modify the timestamp of the packet, obtain the position of modifying the timestamp of the packet, and modify the position of the timestamp of the packet; if it needs to perform the statistics on the packet, count the length of the packets and the number of packets.

The packet processing module 53 is configured to:

judge whether the packet is the end packet of the present node according to the determined OAM type, and if the packet is the end packet of the present node and it is a standard OAM packet, set the end flag of the OAM packet to the valid state, and directly process the packet within the packet processing device; if the packet is the end packet of the present node and is an extended OAM packet, forward the packet to outside the packet processing device, so that other devices outside the packet processing device can process the packet; said setting the end flag to the valid state is: setting the end flag to 1.

Accordingly, as shown in FIG. 6, the packet processing module 53 includes standard packet processing module 531 and extended packet processing module 532; herein, the standard packet processing module 531 is configured to forward the end standard OAM packet of the present node;

the extended packet processing module 532 is configured to forward the end extended OAM packet of the present node;

specifically, when determining that the packet is the end packet of the present node and is a standard OAM packet, the standard packet processing module 531 sets the end flag of the packet to the valid state, and directly processes the packet within the packet processing device; when determining that the OAM packet is the end packet of the present node and is an extended OAM packet, the standard packet processing module 531 forwards the packet to outside the packet processing device, so that other devices outside the packet processing device process the received packet; herein, the OAM identification table can be realized by a Ternary Content Accessible Memory(TCAM), and the content in the OAM identification table can be configured according to the OAM protocol and the specific network structure; in the OAM identification table, fields or bit streams that are not related to the OAM packet may be covered by masks.

Here, when the packet processing module 53 determines that the packet is not the end packet of the present node according to the determined OAM type, the packet processing module 53 looks up the MAC address exchange table according to the destination MAC address of the packet, or looks up the IP routing table of the packet according to the destination IP address of the packet; and forwards the packet according to the MAC address exchange table or the IP routing table.

The MAC address exchange table is a table to be looked up when switching is performed on the Ethernet services, here, the MAC address exchange table is stored in the mode of RAM, and the MAC address exchange table can be automatically updated in the process of switching the Ethernet services.

The IP routing table is a table to be looked up when the IP packet is forwarded, here, the IP routing table may be stored in RAM or in TCAM.

In practical applications, the parsing module 51, the determining module 52, the standard packet processing module 531 and the extended packet processing module 532 provided in the embodiments of the present document may be implemented by a central processing unit (CPU), a digital signal processor (DSP) or a Field Programmable Gate Array (FPGA) with specific circuit implementation.

The packet processing device provided in the embodiment of the present document can be applied to the OAM device, 1588, and similar intelligent packet recognition and processing device.

The packet processing method and device provided in various embodiments of the present document can process the connectivity detection and processing of more than four thousand fast OAM packets in real time, meanwhile, the packet processing scheme provided in the present document extracts the user-defined keyword according to the relative offset value, determines the OAM type of the packet according to the user-defined keyword corresponding to the packet and the threshold interval of the user-defined keyword, and forwards the user-defined packet to outside of the device, so that the packet processing device outside the device can process the packets; this self-adaptive processing structure can be adaptable to various known and unknown OAM protocol packets, which not only can meet the OAM protocol development and update, but also can configure the OAM protocol as the latest OAM protocol through the software configuration method, which improves the device processing capability and extends the applicable scenarios of the device.

Those skilled in the art should appreciate that, the embodiments of the present document may be provided as a method, an apparatus, a device, or a computer program product. Accordingly, the present document can use forms of hardware embodiments, software embodiments, or embodiments combining of software and hardware aspects. Moreover, the present document can use the form of computer program products implemented in one or more computer usable storage mediums having computer usable program codes (including but not limited to disk memory and optical memory, etc.).

The present document has been described by referring to the flow charts and/or block diagrams of the method, apparatus, device and computer program product in accordance with the embodiment of the present document. It should be understood that computer program instructions should be used to implement each procedure and/or block in the flow charts and/or the block diagrams, as well as combinations of the procedures and/or the blocks in the flow charts and/or the block diagrams. These computer program instructions may be provided to a general purpose computer, a special purpose computer, an embedded processor or a processor of another programmable data processing device to produce a machine, such that the instructions executed by the computer or the processor of other programmable data processing apparatus are generated to implement the device implementing the functions indicated in one or more processes in the flow charts and/or one or more blocks in the block diagrams.

These computer program instructions may also be stored in a computer-readable memory that can direct a computer or another programmable data processing device and functions in a particular manner, such that the instructions stored in the computer readable memory produce manufactured goods including the instruction means, and the instruction means achieves the functions indicated in one or more procedures in the flow charts and/or one or more blocks in the block diagrams.

These computer program instructions may also be loaded in a computer or another programmable data processing device, so that the computer or the other programmable device implements a series of operating steps to produce the processing procedures implemented by the computer, so as to the instructions executed in the computer or the other programmable device achieve the functions indicated in one or more procedures in the flow charts and/or one or more blocks in the block diagrams.

The above description is only embodiments of the present document, and it should be noted that, for those of ordinary skill in the art, under the premise of not departing from the principles in the embodiment of the present document, a number of improvements and modifications can be made, and these improvements and modifications should also be considered within the protection scope of the embodiments of the present document.

What is claimed is:

1. A method for processing a packet, comprising:
   a packet recognition and processing device determining a type of a packet according to a parsed packet;
   the packet recognition and processing device extracting a characteristics field of the packet according to the determined type of the packet;
   the packet recognition and processing device determining a user-defined keyword corresponding to the packet and a threshold interval of the user-defined keyword according to the characteristics field;
   the packet recognition and processing device determining an Operation, Administration and Maintenance, OAM, type of the packet according to the determined type of the packet, the user-defined keyword corresponding to the packet and the threshold interval of the user-defined keyword; and
   the packet recognition and processing device performing a corresponding OAM operation on the packet according to the determined OAM type.

2. The method of claim 1, wherein, said determining a type of a packet according to a parsed packet comprises:
   determining a tag type of the packet according to the parsed packet;
   extracting an Ethernet type field of the packet according to the determined tag type of the packet;
   determining the type of the packet according to the extracted Ethernet type field of the packet.

3. The method of claim 1, wherein, said determining a user-defined keyword corresponding to the packet and a threshold interval of the user-defined keyword according to the characteristics field comprises:
   determining a user-defined keyword offset table address index according to the characteristics field;
   looking up an offset address of the user-defined keyword according to the user-defined keyword offset address table index;
   extracting the user-defined keyword of the packet according to the offset address, and determining the threshold interval of the user-defined keyword.

4. The method of claim 3, wherein, the offset address is offset addresses of M extracted user-defined keywords, and accordingly, obtaining the user-defined keyword of the packet according to the offset addresses of the M user-defined keywords.

5. The method of claim 4, wherein, said determining the threshold interval of the user-defined keyword comprises:
   extracting offset addresses of first N user-defined keywords in the offset addresses of the M user-defined keywords;
   looking up a user-defined keyword mask table and a user-defined keyword range table according to the user-defined keyword offset address table index, and determining corresponding user-defined keyword masks;
   performing a corresponding bitwise AND-logical decoding processing on the N user-defined keywords and the determined corresponding user-defined keyword masks;
   determining the threshold interval of the user-defined keyword according to a result of the bitwise AND-logical decoding processing.

6. The method of claim 1, wherein, said performing a corresponding OAM operation on the packet according to the determined OAM type comprises:
   when determining that there is a need to perform a statistics on received packets according to the determined OAM type, counting a length of the packets and the number of the packets; and/or,
   when determining that there is a need to modify a time stamp of a received packet according to the determined OAM type, obtaining a position of modifying the time stamp of the packet and modifying the position of the time stamp of the packet.

7. The method of claim 1, wherein, said performing a corresponding OAM operation on the packet according to the determined OAM type comprises:
   when determining that a received packet is an end packet of a present node and is a standard OAM packet according to the determined OAM type, setting an end flag of the received packet to a valid state, and directly processing the received packet within a packet processing device.

8. The method of claim 1, wherein, said performing a corresponding OAM operation on the packet according to the determined OAM type comprises:
   when determining that a received packet is an end packet of a present node and is an extended OAM packet according to the determined OAM type, forwarding the received packet to outside of the packet processing device, and other devices outside the packet processing device process the received packet.

9. The method of claim 1, wherein, said performing a corresponding OAM operation on the packet according to the determined OAM type comprises:
   when determining that a received packet is not an end packet of a present node according to the determined OAM type, looking up a medium access control, MAC, address exchange table according to a destination MAC address of the received packet, or looking up an Internet Protocol, IP, routing table of the received packet according to a destination IP address of the packet, and forwarding the received packet according to the MAC address exchange table or the IP routing table.

10. The method of claim 1, wherein, when determining that the type of the packet is a Multiple Protocol Label Switching, MPLS, packet, before extracting the characteristics field of the packet according to the determined type of the packet, the method further comprises:

judging whether the packet is an end packet of a present node, and when determining that the packet is the end packet of the present node, setting an end flag of the packet to a valid state.

11. The method of claim 1, wherein, when determining that the type of the packet is an MPLS packet, before said extracting the characteristics field of the packet according to the determined type of the packet, the method further comprises:

judging whether the packet is an end packet of a present node, and when determining that the packet is not the end packet of the present node, directly forwarding the packet.

12. A device for processing a packet, comprising: a memory storing instructions, and a processor which implement the instructions in the memory to parse a packet;

determine a type of the packet according to the packet parsed; extract a characteristics field of the packet according to the determined type of the packet; determine a user-defined keyword corresponding to the packet and a threshold interval of the user-defined keyword according to the characteristic field of the packet; determining an Operation, Administration and Maintenance, OAM, type of the packet according to the determined type of the packet, the user-defined keyword corresponding to the packet and the threshold interval of the user-defined keyword; and perform a corresponding OAM operation on the packet according to the OAM type determined.

13. The device of claim 12, wherein, the processor is configured to:

determine a tag type of the packet according to the parsed packet;
extract an Ethernet type field of the packet according to the determined tag type of the packet;
determine the type of the packet according to the extracted Ethernet type field of the packet.

14. The device of claim 12, wherein, the processor is configured to:

determine a user-defined keyword offset table address index according to the characteristics field;
look up an offset address of the user-defined keyword according to the user-defined keyword offset address table index;
extract the user-defined keyword of the packet according to the offset address, and determine the threshold interval of the user-defined keyword.

15. The device of claim 12, wherein, the processor is configured to:

when determining that there is a need to perform a statistics on received packets according to the determined OAM type, count a length of the received packets and the number of the packets; and/or, when determining that there is a need to modify a time stamp of a received packet according to the determined OAM type, obtain a position of modifying the time stamp of the packet, and modify the position of the time stamp of the packet.

16. The device of claim 12, wherein, the processor is configured to: when determining that a received packet is an end packet of a present node and is a standard OAM packet according to the determined OAM type, set an end flag of the received packet to a valid state, and directly process the received packet within the packet processing device; or, when determining that a received packet is an end packet of the present node and is an extended OAM packet according to the determined OAM type, forward the received packet to outside of the packet processing device, and other devices outside the packet processing device process the received packet.

17. The device of claim 12, wherein, the processor is configured to: when determining that a received packet is not an end packet of a present node according to the determined OAM type, look up a medium access control, MAC, address exchange table according to a destination MAC address of the received packet, or look up an Internet Protocol, IP, routing table of the packet according to a destination IP address of the packet, and forward the received packet according to the MAC address exchange table or the IP routing table.

18. The device of claim 12, wherein, the processor is further configured to, when determining that the type of the packet is a Multiple Protocol Label Switching, MPLS, packet and before extracting the characteristics field of the packet according to the determined type of the packet, judge whether the packet is an end packet of a present node, and when determining that the packet is the end packet of the present node, set an end flag of the packet to a valid state.

19. The device of claim 12, wherein, the processor is further configured to, when determining that the packet type is an MPLS packet and before extracting the characteristics field of the packet according to the determined type of the packet, judge whether the packet is an end packet of a present node, and when determining that the packet is the end packet of the present node, directly forward the packet.

20. A non-transitory computer storage medium, wherein, the computer storage medium comprises a set of instructions, when executing the instructions, causing at least one processor to execute following actions determining a type of a packet according to a parsed packet;
extracting a characteristics field of the packet according to the determined type of the packet;
determining a user-defined keyword corresponding to the packet and a threshold interval of the user-defined keyword according to the characteristics field;
determining an Operation, Administration and Maintenance, OAM, type of the packet according to the determined type of the packet, the user-defined keyword corresponding to the packet and the threshold interval of the user-defined keyword; and
performing a corresponding OAM operation on the packet according to the determined OAM type.

* * * * *